United States Patent

[11] 3,598,330

[72] Inventor Paul O. Gotschewski
Glenview, Ill.
[21] Appl. No. 799,310
[22] Filed Feb. 14, 1969
[45] Patented Aug. 10, 1971
[73] Assignee SCM Corporation
New York, N.Y.

[54] RECORD MEDIUM HANDLING APPARATUS
11 Claims, 7 Drawing Figs.

[52] U.S. Cl. ........ 242/55, 242/57, 242/75.43, 242/190
[51] Int. Cl. ........ B65h 75/02
[50] Field of Search ........ 242/55, 57, 67.2, 75, 75.3, 75.4, 75.43, 75.44, 75.51, 77, 189, 190, 57.1; 352/78

[56] References Cited

UNITED STATES PATENTS

| | | | |
|---|---|---|---|
| 1,952,196 | 3/1934 | Coil | 242/75.43 |
| 2,666,596 | 1/1954 | Rosenburgh et al. | 242/57 |
| 2,969,205 | 1/1961 | Haugwitz | 242/75.43 |
| 3,263,038 | 7/1966 | Walker | 242/57 UX |
| 3,426,976 | 2/1969 | Maxey | 242/189 |

FOREIGN PATENTS

| | | | |
|---|---|---|---|
| 322,224 | 11/1934 | Italy | 352/78 |
| 123,944 | 1/1928 | Switzerland | 242/75.52 |
| 413,755 | 7/1934 | Great Britain | 242/75 |

*Primary Examiner*—Stanley N. Gilreath
*Assistant Examiner*—Werner H. Schroeder
*Attorney*—Joseph J. Grass

ABSTRACT: There is disclosed record medium handling apparatus including a record medium supply reel, record feeding apparatus for drawing record medium off the supply reel through a first path, a device for preventing rotation of the supply reel while slack exists in the record medium in the first path, a second and alternate path through which a record medium can be drawn by the record feeding means, and an alarm and/or means for interrupting record medium feed operable when there is no record medium in at least one of the first and second paths, or when a tight-tape condition exists.

PATENTED AUG 10 1971 3,598,330

Inventor
PAUL O. GOTSCHEWSKI

Joseph J. Grass
Attorney

RECORD MEDIUM HANDLING APPARATUS

FIELD OF THE INVENTION

This invention relates to record medium handling apparatus and in particular to apparatus for feeding record medium such as tape to a utilization device and also for effecting a function related to record medium handling, such as operating an alarm and/or turning off the drive for the record feeding apparatus when the supply of record medium is exhausted or wen a tight tape condition exists.

SUMMARY OF THE INVENTION

The invention relates to novel structure for causing record medium to be supplied to a suitable utilization device such as a recorder. The record medium is pulled or drawn from a freely rotatable supply reel by a record feeding device. The reel is permitted to rotate whenever the record feeding device causes sufficient tension to exist in the record medium. The tension, or lack of it, in the record medium between the reel and the record feeding device is continuously sensed, and when slackness begins to exist and so long as it exists in the record medium further rotation of reel in either rotational direction is prevented. This arrangement prevents an excess amount of record medium from coming off the reel. Specifically, a sensing member responsive to the amount of tension in the record medium controls a movable stop member having a pair of stop faces. The outer surface of the reel has spaced apart notches each of which provides a pair of stop faces. As tension in the record medium lessens, the stop member moves into riding engagement with the outer surface of the reel until the stop faces of the stop member can move into the next notch which present s itself so that the stop faces of the stop member can cooperate with the reel stop faces, thereby preventing rotation of the reel in either direction. Record medium can be supplied to the utilization device either via a first path from a reel or alternately via a second path from another source, such as fan-folded tape. A first sensing device senses the presence of record medium in the first path and a a second sensing device senses the presence of record medium in the second path. The drive for the record medium is interrupted and/or an alarm are operated when there is no record medium in at least one of the first and second paths, or when a tight-tape condition exists in the first path; the sensing devices are interconnected by linkage which can operate a switch to effect either one or both of these functions.

Other features and advantages of the invention will be apparent from the following detailed description and the accompanying drawing.

DESCRIPTION OF THE PREFERRED EMBODIMENT

Figures 1, 2, 3, 4, 5, 6:
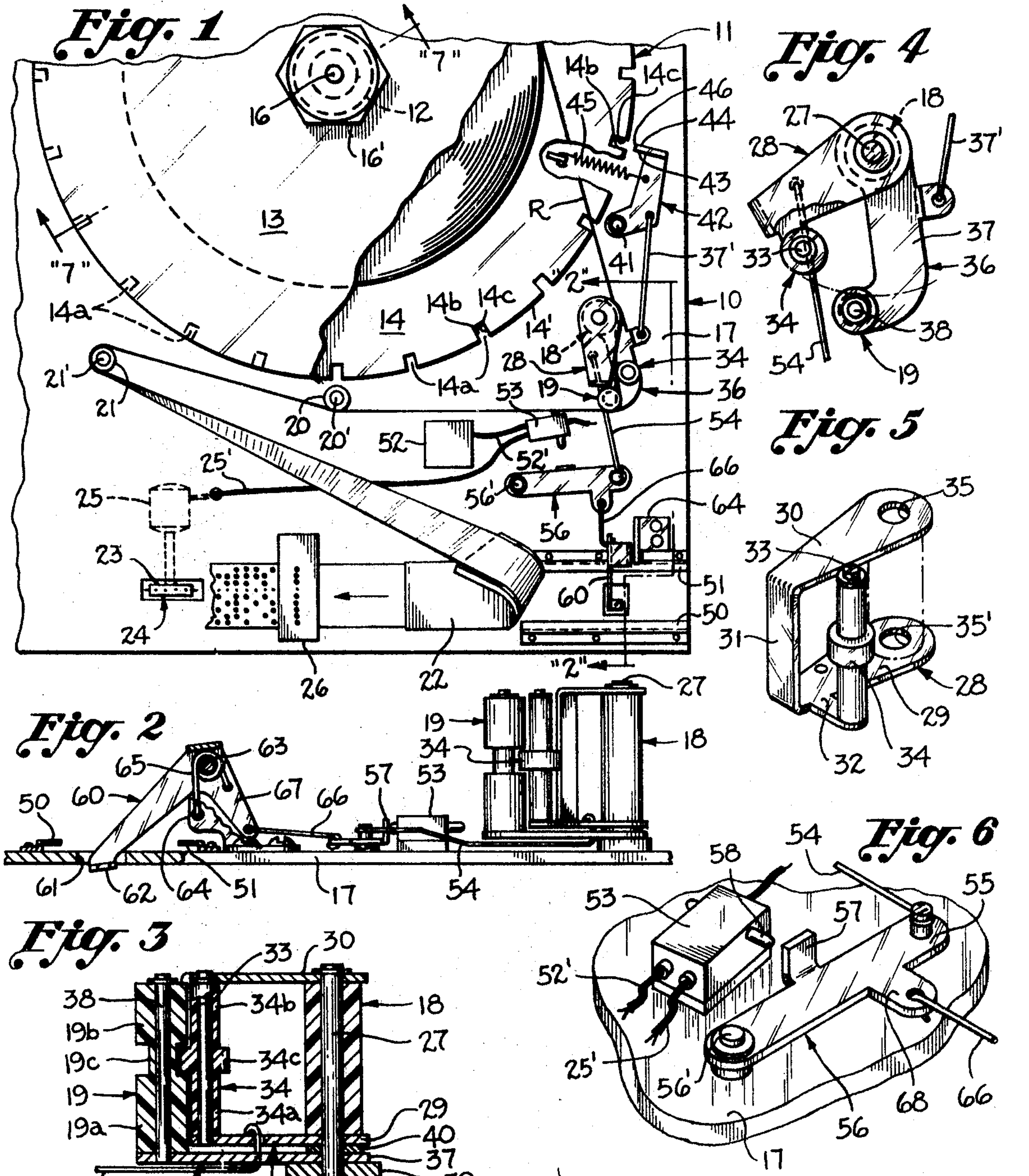
FIG. 1 is a top plan view of record medium handling apparatus in accordance with invention.
FIG. 2 is a sectional view taken along line 2–2 of FIG. 1, but showing various components in positions in which there is no record medium in the apparatus.
FIG. 3 is a sectional view showing three rollers of two sensing devices in alignment with respect to each other.
FIG. 4 is a top plan view of two sensing members also shown in FIGS. 1, 2 and 3.
FIG. 5 is a perspective view of one of the sensing members.
FIG. 6 is a fragmentary perspective view of a three-armed pivotal link and an associated switch.
Figure 7:
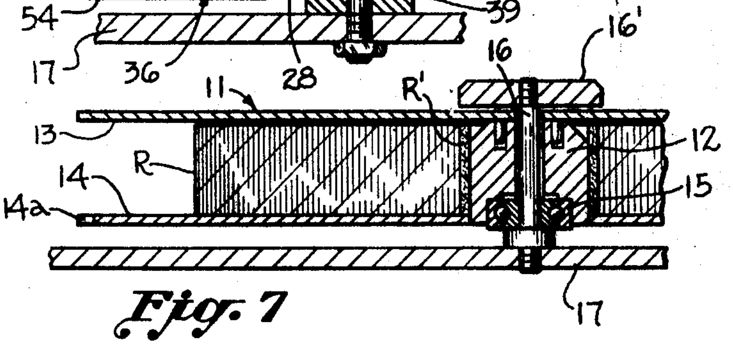
FIG. 7 is a sectional view taken along line 7–7 of FIG. 1.

Referring to FIG. 1, there is shown a record medium handling apparatus generally indicated at 10. The record medium R is illustrated as being a record tape. The record medium R in the form of a roll of tape is received a hub 12 of a reel 11 between sideplates plates 13 and 14. The end of the record medium R is secured to a tubular core or ring R′. The sideplate 14 has spaced apart notches 14*a* at its periphery. The hub 12 is press fitted onto a ball bearing 15 which in turn is press fitted onto a post or pin 16. The pin is anchored to the frame 17. The sideplate 14 is suitably secured to the hub 12. The upper end of the pin 16 threadably receives a nut 16′ which prevents the sideplate 13 from being accidentally displaced.

The record medium R is drawn off the reel 11 through a sinuous path in contact with rollers 18, 19, 20 and 21 and a curbed guide plate 22 by a sprocket wheel 23 of a record medium feeding device generally indicated at 24. A friction feeding member, instead of a sprocket, can be used, if desired. A suitable drive device such as a stepping motor 25 which is secured to the underside of the frame 17 can be used to drive the sprocket 23 stepwise. A utilization device 26 is shown to take the form of a recorder, specifically a code perforator, by which code and feed holes can be punched in the record medium R. Any other suitable utilization device such as a printer, a magnetic recorder, a reader, or the like, can be used instead. The sprocket 23 engages the feed holes and thereby exerts a pulling force on the record medium R as the sprocket 23 rotates.

As best shown in FIGS. 2 and 3, the roller 18 and a sensing member 28 are rotatably mounted by a post or pin 27 secured to the frame 17. The sensing member 28 has a pair of arms 29 and 30 and a bight 31. The arm 29 has a small extension 32. An upstanding post or pin 33 is secured to the extension 32. A roller 34 is rotatably received by the pin 33. The arms 28 and 30 have apertures 35 and 35′ in which the post 27 is received. The roller 18 is disposed between the arms 29 and 30. The roller 18 is freely rotatable relative to the sensing member 28. A sensing member 36 includes an arm or plate 37 to which an upstanding post or pin 38 is secured. The arm 37 is rotatably mounted by the pin 27 and the roller 19 is rotatably received by the pin 38. The plate 37 is spaced from the frame 17 by a washer 39 which is received by the pin 27. The arm 29 is spaced from the arm 37 by a washer 40 which is received by the pin 27.

The rollers 20 and 21 are rotatably received by respective posts or pins 20′ and 21′ which are secured to the frame 17. An upstanding post or pin 41 pivotally mounts a stop member 42. The stop member 42 has stop faces 43 and 44. A tension spring 45 normally urges the stop member 42 counterclockwise (FIG. 1). The one end of the spring 45 is connected to the stop member 42 and its other end is connected to the frame 17. A rigid rod 37′ is pivotally connected at one end to the bracket 36 and at its other end to the stop member 42. When the record medium R is under tension in the path of movement shown in FIG. 1 the stop member 42 is held in the position shown against the force of the spring 45. As the reel 11 is freely rotatable, the record medium R can be drawn off the reel as the sprocket 23 rotates. Should the reel 11 rotate so that the tension in the record medium R decreases, then the spring 45 will pivot the stop member 42 counterclockwise (FIG. 1) until face 46 of the stop member 42 starts riding on the outer periphery or surface 14′ of the sideplate 14. When the face 46 of the stop member 42 is aligned with the next notch 14*a* which presents itself, the stop member 42 will pivot even further counterclockwise (FIG. 1) until the stop faces 43 and 44 move to a position between stop faces 14*b* and 14*c*. It is apparent that as long as slack exists in the record medium R, the spring 45 will cause the stop member 42 to either move into a notch 14*a* or to ride along peripheral surface 14′ of the sideplate 14 until a notch 14*a* is presented in its path. The stop faces 14*b* and 14*c* of each notch 14*a* are spaced apart wider than the stop faces 43 and 44 of the stop member 42 are spaced apart, so that the member 42 can easily enter any notch 14*a* which is presented in its path. Should the tension in the record medium R increase sufficiently so that the sensing member 36 is pivoted clockwise (FIG. 1) then the sensing member 36 will pivot the stop member 42 clockwise against the force of the spring 45 until stop faces 43 and 44 are no longer in the path of respective stop faces 14*b* and 14*c*. When the stop member 42 has moved to this position, the reel 11 is free to rotate.

The record medium R can be supplied to the utilization device 26 through the path which the record medium R is shown to take in FIG. 1. Alternately record medium (not shown) can be supplied to the utilization device 26 through a different and alternate path, namely, between the frame 17 and guides 50 and 51. If there is no record medium in either of these paths a suitable function, such as operation of an alarm 52 and/or interruption of the step feeding movement of the record medium R by deactuating stepping motor 25 can be accomplished by operation of a switch 53. The alarm 52 can be a light, a buzzer, or the like. The switch 53 is connected to a suitable source of electrical energy and to the alarm 52 via conductors 52′ and to the stepping motor 25 via conductors 25′. Control circuits for the stepping motor 25 have not been shown.

So long as record medium exists between rollers 34 and 19 the sensing member 28 cannot pivot clockwise (FIG. 1) sufficiently to effect closure of the switch 53. A rigid rod 54 is pivotally connected in one end to the sensing member 28 and is pivotally connected at its other end to one arm 55 of a three-armed lever generally indicated at 56. The lever 56 is pivotally mounted by an upstanding post or pin 56′ which is mounted by the frame 17. Clockwise pivoting of the sensing member 36 from the position shown in FIG. 1 to the position shown in FIG. 4 will cause a tab 57 of the lever 56 to operate switch button 58 thereby effecting both operation of the alarm 52 and interruption of operation of the stepping motor 25.

The roller 19 has circular sections 19*a* and 19*b* with the same outside diameter joined by a circular section 19*c* which has a lesser outside diameter than the sections 19*a* and 19*b*. Thus, the section 19*c* is offset with respect to the sections 19*a* and 19*b*. The roller 34 has circular sections 34*a* and 34*b* with the same outside diameter joined by a section 34*c* which has a larger outside diameter than the sections 34*a* and 34*b*. The section 34*c* is slightly shorter than the section 19*c* as is evident from FIGS. 2 and 3. The lower plate 29 of the sensing member 28 mounts the roller 34 in such a position with respect to the roller 19 so that when the sensing members 28 and 36 are pivoted relative to each other, the sections 34*a*, 34*b* and 34*c* move relatively close to respective sections 19*a*, 19*b* and 19*c*, as best shown in FIG. 3 in which the three rollers 18, 19 and 34 are shown to be in alignment. As is evident from the drawings, the offsets in the rollers 19 and 34 provided by their complementary coacting sections 19*a*, 19*b* and 19*c* and 34*a*, 34*b* and 34*c* prevents the sensing member 28 from pivoting clockwise relative to the sensing member 36 as long as there is record medium between the two rollers 19 and 34. Thus, it is evident that when no record medium exists between the rollers 19 and 34 that the sensing member 28 can pivot from the position shown in FIG. 1 to the position shown in FIG. 4, thereby effecting operation of the switch 53.

For sensing the presence or absence of record medium in the alternate path described above, a sensing member 60 is positioned above the alternate record medium path in the position shown in FIG. 1. In the position shown in FIG. 2, the sensing member 60 is shown in a counterclockwise position in which it extends through an aperture 61 in the frame 17. If there were record medium in the alternate path it would prevent end 62 of the sensing member 60 from entering the aperture 61. The sensing member 60 is pivotally mounted on a pin 63. The pin 63 is fixedly mounted by a bracket 64 secured to the frame 17. A spiral spring 65 received by the pin 63 is connected at one end to the sensing member 60 and its other end to the bracket 64. The spring exerts a biasing force on the sensing member 60 ending to urge the sensing member 60 counterclockwise (FIG. 2). A rigid rod 66 is pivotally connected at one end to an arm 67 of the sensing member 60 and is pivotally connected at its other end to an arm 68 of the three-armed lever 56. As the sensing member 60 is connected to the rigid rod 66 which is connected to the lever 56 which in turn is connected to the rigid rod 54, it is apparent that the spring 65 also tends to bias the sensing member 28 clockwise. It is also apparent that if there is record medium in either of the paths of record medium movement defined above, the spring 65 cannot cause the lever 56 to be pivoted counterclockwise (FIG. 1) to operate the switch 53.

The switch 53 will also be operated when a tight-tape condition is sensed. Should the feeding device 24 continue to attempt to draw record medium off the reel 14 when the supply of record tape R is exhausted, the record tape R will become very tight because the end of the record tape R is secured to core R′. This will cause the sensing member 36 to pivot clockwise (FIG. 1). When the sensing member 36 pivots clockwise, the sensing member 28 also pivots clockwise under the influence of spring 65; under such a tight-tape condition the sensing member 28 pivots clockwise sufficiently to cause operation of the switch 53 through rod 54 and lever 56, thereby controlling functions related to record medium handling such as described above. It is apparent that the sensing member 36 acts as a control means for the sensing member 28. Thus, it is apparent that these functions will be effected even though record medium R still exists between rollers 19 and 34.

Other embodiments and modifications of this invention will suggest themselves to those skilled in the art, and all such of these as come within the spirit of this invention are included within its scope as best defined by the appended claims.

I claim:

1. Record handling apparatus, comprising: record feeding means, means defining a first path for movement of record medium to said record feeding means, means defining a second and alternate path for movement of record medium to said record feeding means, first sensing means for sensing the absence of record medium in said first path, second sensing means for sensing the absence of record medium in said second path, output means for providing an indication of record medium condition, and means responsive to one of said first and second sensing mean~ fo~ actuating said output means only when there is no record medium present in at least one of said first and second paths.

2. The invention as defined in claim 1, wherein said actuating means includes a linkage interconnecting said first and second sensing means, and a switch electrically connected to said alarm means and responsive to movement of said linkage.

3. Record handling apparatus, comprising: a freely rotatable record medium supply reel, record feeding means for progressively drawing record medium off said supply reel, said record medium being pulled through a predetermined path extending from said reel to said record feeding means, means effective while there is slack in the record medium in the path for automatically preventing rotation of said reel, output means for providing an indication of record medium condition, and means common in part with said rotation preventing means for operating said output means in the absence of record medium in the path.

4. Record handling apparatus in accordance with claim 3, at least one pair of opposing stop faces associated with said reel, said rotation preventing means including sensing means movable by the record medium, and stop means having stop faces cooperable with said stop faces which are associated with said reel when said sensing means senses slackness in the record medium.

5. The invention as defined in claim 4, wherein said reel has a generally circular outer periphery, there being a plurality of pairs of circumferentially spaced apart stop faces at the outer periphery of said reel, said stop means being held out of contact with said reel as long as said sensing means senses no slackness in the record medium, said outer periphery of said reel being a guide against which said stop member can ride until said reel is in a position in which said stop faces of said stop member can engage said stop faces of said reel.

6. The invention as defined in claim 4, including pivot means, a first roller rotatably mounted by said pivot means, said sensing means including a bracket pivotally mounted by said pivot means, a second roller carried by said bracket, said first and second rollers being spaced apart and bearing against one side of the record medium, a third roller bearing against the other side of the record medium at a location between the first and second rollers, means mounting said third roller for pivotal movement about said pivot means, means acting on said third roller mounting means for urging its third roller against the record medium so that when there is record medium in the path of said third roller movement of said third roller mounting means and its third roller is prevented, but in the absence of record medium in the path of said third roller said third roller moves to a position to effect actuation of said output means.

7. The invention as defined in claim 6, wherein said output means include an alarm.

8. Record handling apparatus, comprising: means for controlling record medium feed including a first sensing member engageable with one side of a record medium for sensing slackness in the record medium, output means for providing an indication of record medium condition, and operator means for actuating said output means including a second sensing member engageable with the other side of the record medium for sensing absence of record medium, said first and second sensing members having means for preventing said second sensing member from being effective while record medium exists between said first and second sensing members.

9. The invention as defined in claim 8, wherein said first sensing member includes a first roller having a first offset, and said second sensing member includes a second roller having a second offset which is complementary with said first offset of said first roller.

10. Record handling apparatus, comprising: output means for providing an indication of record medium condition, means for controlling record medium feed including first sensing means engageable with one side of a record medium, second sensing means engageable with the other side of the record medium for enabling said first sensing means to move when there is no record medium between said first sensing means and said second sensing means to activate said sensing means whereby the same is movable in response to a tight condition of the record medium to enable said first sensing means to move and to activate said output means.

11. The invention as defined in claim 10, including a freely rotatable reel containing a roll of record medium, said first sensing means being responsive to slackness in the record medium for preventing rotation of said reel.